United States Patent [19]

Byung-Sik

[11] Patent Number: 4,833,489
[45] Date of Patent: May 23, 1989

[54] ELECTRICAL F·θ CORRECTION SYSTEM IN A LASER PRINTER

[75] Inventor: Chun Byung-Sik, Buchon, Rep. of Korea

[73] Assignee: Samsung Electronics Co., Ltd., Kyounggi-do, Rep. of Korea

[21] Appl. No.: 139,743

[22] Filed: Dec. 30, 1987

[51] Int. Cl.$^4$ .................. G01D 9/42; G02B 26/08; H01L 25/00

[52] U.S. Cl. .................... 346/108; 350/6.8; 250/332; 250/347

[58] Field of Search ............. 346/108, 107 R, 76 L, 346/160; 350/6.8, 6.7; 250/332, 334, 347

[56] References Cited

U.S. PATENT DOCUMENTS

| | | | |
|---|---|---|---|
| 4,257,053 | 3/1981 | Gilbreath | 346/108 |
| 4,306,242 | 12/1981 | Jeffery | 346/108 |
| 4,613,877 | 9/1986 | Spencer | 350/6.8 |
| 4,755,030 | 7/1988 | Araki | 350/6.8 |

Primary Examiner—E. A. Goldberg
Assistant Examiner—Mark Reinhart
Attorney, Agent, or Firm—Robert E. Bushnell

[57] ABSTRACT

In optical scanning system of laser printer, laser lights are scanned at uniform speed on a photosensitive plane through the projection lens which brings focuses on the photosensitive element. The f·θ correction technique is required so that the light reflected from the rotating mirror at the angle θ formed between the light ray and the light axis may be made incident at a position c constant times as large as the angle θ onto the photosensitive drum. The f·θ correction is, without constituting and using the known optical system by a plurality of lenses, electrically performed by attaching to the rotating polygon mirror a chopper grooved at intervals, corresponding to the uniform speed correction to generate the pulse signal, thereby obtaining the optimum width of picture line.

25 Claims, 4 Drawing Sheets

ELECTRICAL F·θ CORRECTION SYSTEM IN A LASER PRINTER

BACKGROUND OF THE INVENTION

The present invention relates generally to a f·θ correction system, and more particularly to the electrical f·θ correction system in a laser printer which removes by the electrical f·θ correcting method picture distortion due to the uniform speed scanning by the electrical f·θ correcting method.

Figure 1:
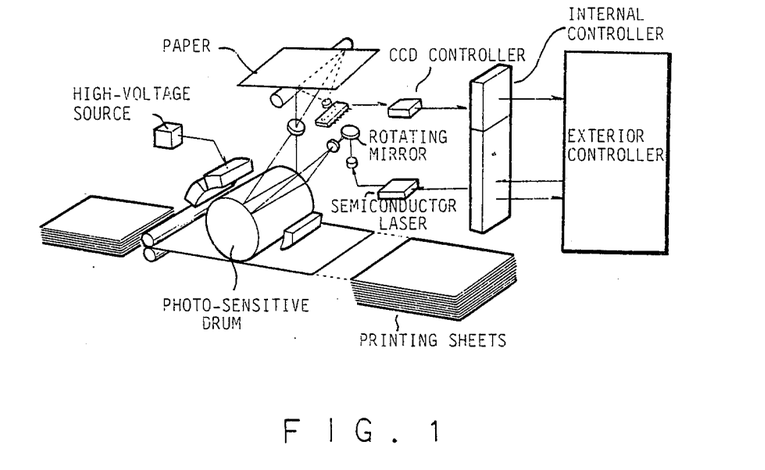
FIG. 1 is a schematic view illustrating a laser printer.

In general, a laser printer is a kind of electrophotography system which can perform a high quality of high speed print (more than 20 sheets/minute in A4 size) by coupling the high precision optical system with the semiconductor laser as shown in FIG. 1. The construction of the optical system determines the laser output required in relation to the oscillation wavelength and the light-splitting sensitivity of the photosensitive element, and is influenced by the size of the apparatus and the print speed thereof.

Since, in the laser printer, the reception sensitivity of the laser by the photosensitive element is lowered at long wavelengths, lasers emitting visible light which is easily sensed by said photosensitive element have been nowadays widely applied, also a rotating polygon mirror which is a deflector for deflecting the beam in dependence upon the print information transmitted as the electric signal has been used as an attachment, and a correction system for raising the print quality has been used.

Furthermore, in an optical scanning system of the laser printer, it is known as the major technique that a linear scanning is performed to form the focus on the photosensitive element that scans the laser light at uniform speed. However, since in the above-mentioned technique the scanned beam through the rotating polygon mirror does not form a circular arc on the focal plane, a linear focal plane may not be formed on the photosensitive drum and the beam through the polygon mirror rotated at uniform speed is not scanned onto the scanned plane(of said drum), thereby resulting in the occurence of the severe distortion or deformation of the picture in printing.

Figure 2:
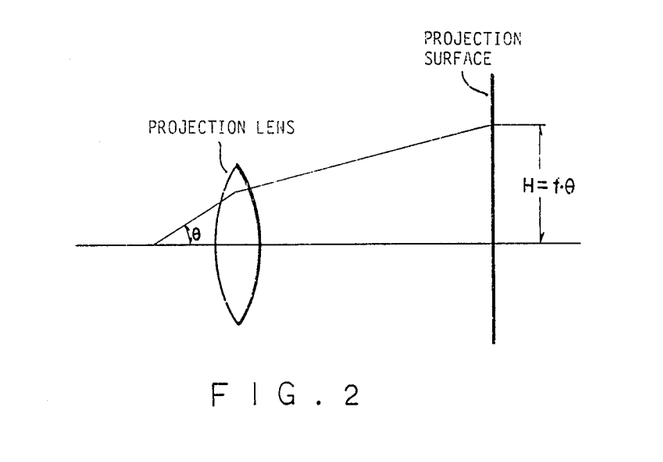
FIG. 2 is a schematic view showing the scanning system in a printer.

Accordingly, in order to correct the above-mentioned defects, technical analysis the above-mentioned uniform speed scanning was required. Referring to FIG. 2 to put it concretely, there is shown schematically a scanning system in a printer. Assuming that in a general lens the focal distance or length is f and that the angle formed between the light ray and the light axis is θ, the image height(H) of the object positioned on the infinite origin may be given by the following equation:

$$H = f \cdot \tan\theta \quad (1)$$

Thus, since the laser printer performs the scanning of the beam through the mirror rotating at constant angular velocity so that the height H of the image may be proportional to tan θ, the greater the distance from the light axis, the higher the scanning speed, thereby resulting in distortion of the image. Therefore, as shown in FIG. 2, there is a necessity for correcting the rotating mirror to arrange the height of image on position of a constant times of θ. This is called the f·θ correction. Such a conventional f·θ correction has been optically performed by coupling a plurality of convex and concave lenses. Thus the f·θ correcting lenses have been separately used which obtain the f·θ characteristics by selecting the refractive index which can be obtained as if laser light reflected from the rotating polygon mirror is emitted from the curvature center of a sphere.

However, since between one and nine lenses for the f·θ characteristic are used and this also requires high precision processing and a complex design technique, the conventional f·θ correction system has the problem of not having the high precision due to the complication of controls and increased cost of production due to the expensive f·θ correcting lens and the complication of construction.

SUMMARY OF THE INVENTION

Accordingly, an object of the present invention is to provide a circuit which easily solves said problem and electrically performs the f·θ correction method.

Another object of the present invention is to provide a circuit which arranges a correcting circuit and a chopper plate grooved at intervals corresponding to constant speed correction on a shaft of a rotating polygon mirror thereby to make the uniform speed scanning possible.

Still another object of the present invention is to provide a laser printer system in which the optical system is simple so that coupling and control of the light path are easily performed.

Yet another object of the present invention is to provide an apparatus which makes it possible to scan at constant speed the laser beam generated from a laser diode actuator driven by the voice coil motor on the photosensitive plane so that the focus becomes linear.

According to the present invention, in order to achieve said objects, the electrical f·θ correction system in a laser system provided with a rotating polygon mirror for deflecting the laser beam, a collimator lens for deflecting the laser beam into the parallel light, a photosensitive drum, a photo diode for detecting the beam reflected by a reflecting mirror after completion of scanning of one line, an amplifier for amplifying said detected beam, a horizontal synchronizing pulse generator for receiving the output from said amplifier to generate the syncronizing pulse, and a delay circuit for producing the delay synchronizing pulse for whole synchronizing to reset a counter, characterized in that said f·θ correction system comprises a drive signal detecting means for detecting the predetermined signal by rotation of a chopper grooved at intervals corresponding to the uniform speed correction and disposed on the driving shaft of said rotating polygon mirror, a driving pulse generating means for generating the pulse by said driving signal detecting means, a counting means for counting the pulse signal produced by said driving pulse generating means, a clock generating means for generating the pulse by driving a three state buffer at periods corresponding to the scanning angle θ of correcting beam according to a sequential select signal output from said counting means, a buffer circuit in which picture information is stored, a latch circuit for enabling sequentially said picture information stored in said buffer circuit by the output signal from said clock generating mean, a laser beam driver for driving the output from said latch circuit, and an actuator for generating the laser beam modulated by the output signal from said laser beam driver.

BRIEF DESCRIPTION OF THE DRAWINGS

The invention will become more readily apparent from the following description of a preferred embodiment thereof shown, by way of example only, in the accompanying drawings in which.

DESCRIPTION OF THE PREFERRED EMBODIMENT

Figure 3:
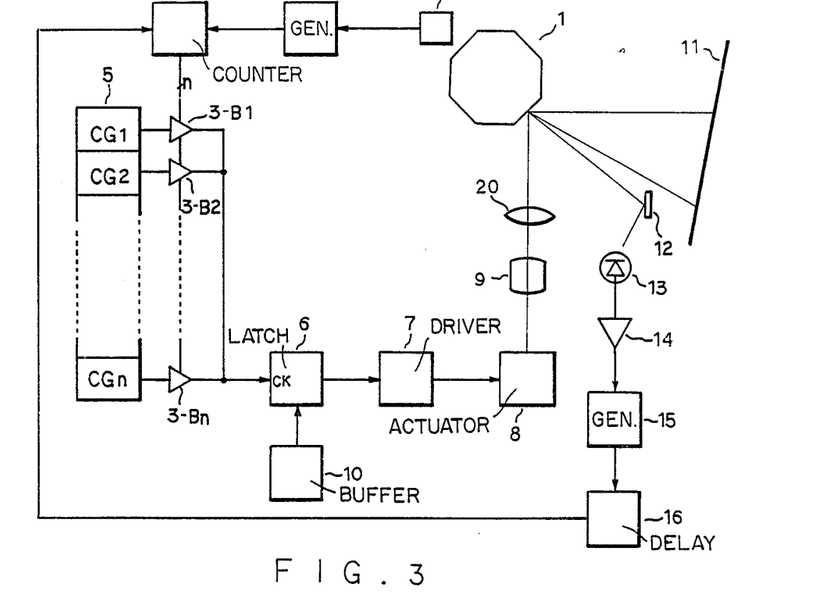
FIG. 3 is a block diagram showing an electrical correcting system according to the present invention.

Referring to FIG. 3 which shows in block form an electrically correcting system according to the present invention, reference numeral 1 represents a rotating polygon mirror. Said correcting system is constituted by a driving pulse detector means(2) for detecting by photo sensing the predetermined pulse from the grooves of the chopper due to rotation of said chopper grooved at intervals corresponding to the uniform speed correction and disposed on the driving shaft of said rotating polygon mirror(1), a driving pulse generator(3) for generatinga pulse in response to an output signal from said driving pulse detector means(2), a counter(4) for counting the pulse signal produced by said driving pulse generator(3), a clock generator(5) for sequentially selecting the gate enable terminals of 3-state buffer(3-B1), (3-B2)... (3-Bn) of the driving terminals at a period corresponding to scanning angle $\theta$ according to signals counted in said counter(4) and selectively outputting the clock signals generated in each clock generator(CG1~CGn), a buffer circuit(10) for storing the picture information therein, a latch circuit 6 for sequentially enabling said picture information stored in said buffer circuit(10) by the output signal from said clock generating means(5), a laser beam driver(7) for driving the output from said latch(6) to become an adequate signal in the laser beam, an actuator(8) for producing the modulated laser beam to control displacement according to the scanning angle of the light beam by causing current to flow through the coil of the moveable part provided with a laser diode by a buffered signal from said laser beam driver(7) and by giving the displacement to the laser beam by force produced in the direction of the light axis, a collimating lens(9) for deflecting the laser beam produced in said actuator(8) into parallel light ramp, an imaging lens(20) for making the focus formal on the photosensitive drum(11), a photo diode(13) for detecting the beam reflected by a reflecting mirro(12) after scanning completion of one line, amplifier(14) for amplifying said detected beam, a horizontal synchronizing pulse generator(15) for receiving the output signal from said amplifier(14) to generate the synchronizing pulse, and a delay circuit(16) for producing the delay synchronizing pulse for whole synchronizing to reset said counter(4).

Figure 4:
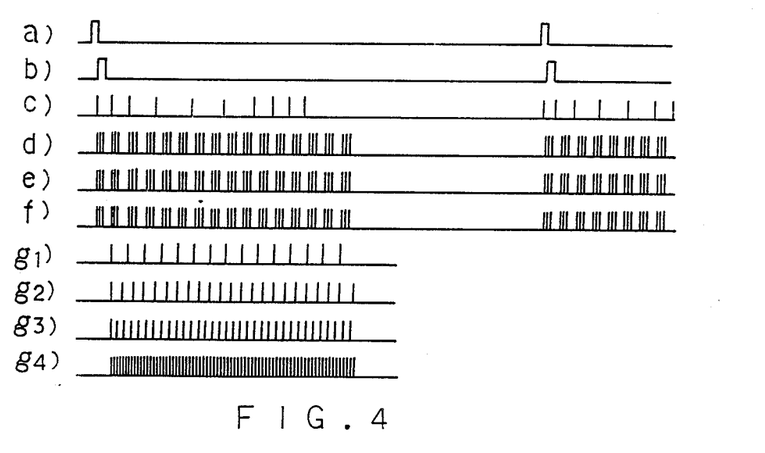
FIG. 4 shows waveforms of outputs from each componet in FIG. 3.

In FIG. 4 which shows waveforms of outputs from each component in FIG. 3, waveform(a) is a signal waveform of the synchronizing pulse outputted from the horizontal synchronizing pulse generator(15), waveform(b) is a reset signal applied from the delay circuit(16) to the counter(4), waveform(c) is a pulse signal outputted from the driving pulse generator(3), waveform(d) is an output signal from the clock generator(5), waveform(e) is an output signal from the buffer circuit(10), waveform(f) is an output signal from the latch circuit(6); and each of waveforms(g1-g4) are output signals from each of clock generators(CG1~CGn) of the clock generating means(5) through the 3-state buffers(3-B1, 3-B2, ... 3-Bn) thereof.

Figure 5:
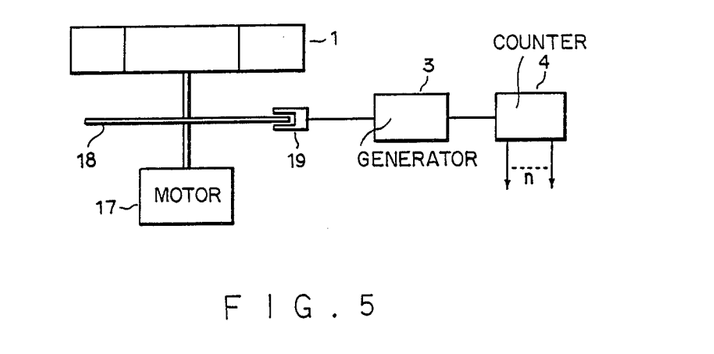
FIG. 5 shows schematically a pulse generator means for selecting clocks.

Referring now to FIG. 5 which shows in detail said driving pulse detector(2). Reference numeral 18 represents a chopper(i.e. a stroboscope), reference numeral 19 represents a photo coupler, and reference numeral 17 represents a motor, which is constituted to operate together with said chopper(18) and the rotating polygon mirror(1) formed integrally onto the shaft thereof when rotating.

Figure 6:
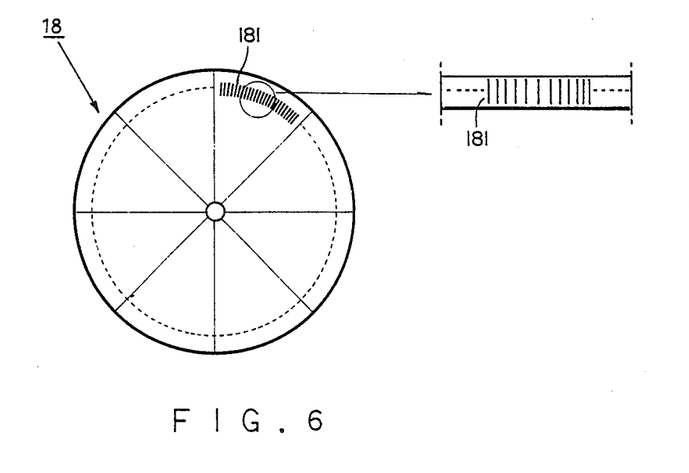
FIG. 6 shows a chopper in said pulse generating means shown in FIG. 5.

FIG. 6 shows chopper(18) shown in FIG. 5, wherein said chopper(18) contains a plurality of grooves (181) arcuately spaced at intervals corresponding to the uniform speed correction.

Figure 7:
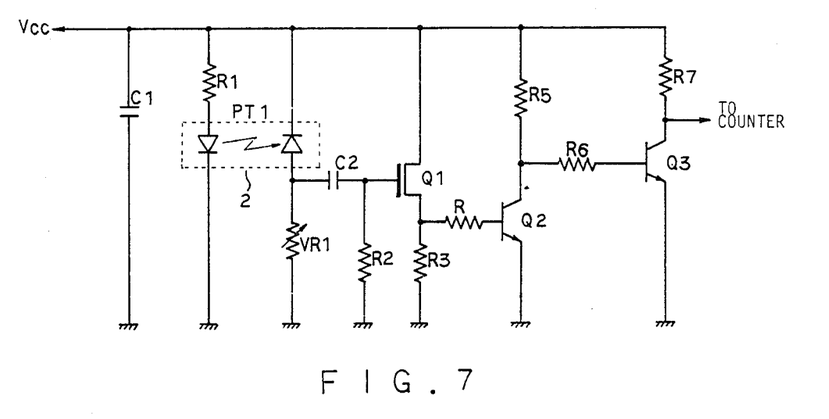
FIG. 7 shows in detail a circuit diagram of a driving pulse detector(2) and a driving pulse generator(3)

Referring to FIG. 7 which shows in detail a circuit diagram of driving pulse detecting means(2) and said driving pulse generating means(3), a capacitor(C1) is connected in paralled with a resistor(R1), a resistor(R1) and a variable resistor(VR1) are connected in series to the photo coupler (PT1) and the output terminal of said photo coupler(PT1) is connected in parallel with a capacitor(C2) and said resistor(VR2), the output terminal of said connection is connected to resistor R2 and the gate of the field-effect transistor(FET)(Q1), the source terminal of the field-effect transistor(Q1) is connected to resistor (R4) and resistor(R3) for distributing the output thereof and is connected through said resistor(R4) to the base terminal of a transistor(Q2), and the collector terminal of said transistor(Q2) is connected to the distributing resistors(R5 and R6) and through said resistor(R6) to the base terminal of the transistor (Q3), thereby to obtain the driving pulse signal from the collector terminal of said transistor(Q3). Also said photo coupler(PT1) corresponds to said driving pulse detecting means(2).

Figure 8:
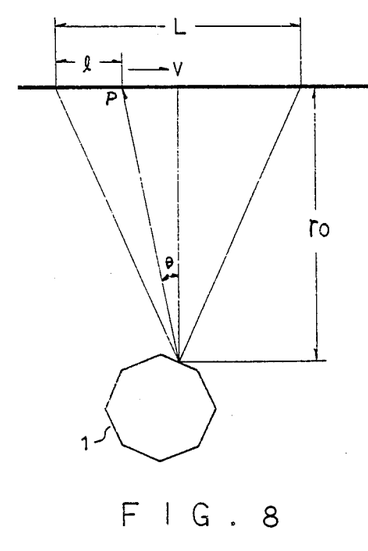
FIG. 8 shows an optical scanning system.

In FIG. 8 which shows the optical scanning system, reference numeral 1 represents the distance of lefthand starting end on the scanning line, L the full width of scanning line, $\theta$ the scanning angle of light beam, and ro the shortest distance between the scanning plane and the drum.

Now the present invention will be described in detail with reference to the preferred embodiment and to the above-mentioned drawings.

In the optical scanning system of FIG. 8, assuming that when the scanning angle $\theta$ of light beam is zero($\theta=0°$) the velocity is Vo, the velocity(V) of light spot at any point on the scanning line(L) is expressed as the following equation: $V=(Vo)/\cos^2\theta$.

On the one hand, if the period for reading-out the data corresponding to one point on the scanning line is T, to constantly maintain the space per 1 dot on the scanning line, VT should be constantly controlled. Namely $VT=(VoT)/\cos^2=VoTo$, wherein since the period becomes $T=To\cos^2\theta$, the uniform speed scanning on the scanning line can be performed by controlling the period(T) as the function of $\cos^2\theta$.

Accordingly, by dividing the scanning angle and the period of the clock into suitable space, at any angle, the clock signal corresponding to this is produced from each of the clock generators. Also, into each of the clock generators is coupled, as shown in FIG. 5, the chopper(18) grooved (i.e., slotted) at intervals corresponding to the uniform speed correction and attachedly disposed on the shaft of the motor(17) as is the case of the rotating polygon mirror(1), and while said chopper(18) and said rotating polygon mirror(1) are integrally rotated upon the rotating of said motor(17) and the grooves (i.e.; slot) of said chopper(18) are passed through the photo coupler(19), the desired pulses according to the uniform speed correction are detected in the photocoupler(PT1) in FIG. 7.

This detected signal output corresponds to that output by the driving pulse detecting means(2), and is differentiated into the spike waveform thereby to be supplied as the driving signal to the gate terminal of the field-effect transistor(Q1), whereby the pulse is outputted through the transistors(Q2 and Q3). This pulse output corresponds to that output from the driving pulse generator(3) in FIG. 3. This output signal waveform is continued in pulse train together with the synchronizing signal the waveform in FIG. 4(a) as the desired waveform in FIG. 4(c). Clock signals produced are inputted to the counter such as a ring counter, and then are counted by it. Said counter(4) is provided with a plurality of output load terminals(n). Since each output of said terminals(n) is applied to the gate enable terminals of 3-state buffers(3-B1, 3-B2...3-Bn) to be sequentially selected and enabled, as shown by the waveforms(g1–g4) in FIG. 4 the frequencies are different from each other and the select clock signal produced in each of the clock generators(CG1–CGn) is outputted to be applied to the clock terminal of the latch circuit of FIG. 3 for a given angle. Therefore the picture information stored in the buffer circuit(10) at this period is sequentially enabled thereby drive the laser beam driver(7) through the latch circuit. Also this output is supplied to the actuator(8) driven by the voice coil motor to make the focal plane linear. Since the current flows through the coil wound on a moveable provided with the laser diode, said actuator displaces the laser by force in the direction of the light axis.

Namely, said moveable part is supported by the flexure and the elastic coefficient of this is small in the direction of the shaft, Therefore laser diode displacement is given only in the axial direction, and in actuator(8) the driving current flows therethrough so that the required displacement is obtained according to the scanning angle($\theta$) and the driving frequency $$\left(fo = \frac{1}{2\pi\sqrt{mCm}}\right)$$

is determined.

Namely, since, when the height of the scanning line of the image is H, H=f·$\theta$. Accordingly H is proportional to $\theta$ as H$\alpha\theta$. Therefore the uniform speed scanning can be performed by the electrical method. The modulated beam is deflected as parallel light beams through the collimating lens(9) and the uniform speed scanning is performed to bring into focus through the imaging lens(20) onto the photosensitive drum(11). Accordingly, a distortionless picture is formed thereon.

Also, if the light power is controlled according to the data reading-out period and is controlled according to the scanning angle of the light beam, the printing can be performed without distortion of the entire picture.

On the other hand, after scanning of one line, the beam reflected by the reflecting mirror(12) is detected by the photo diode(13), this detected output is amplified by the amplifier(14), the synchronizing pulse is produced by the horizontal synchronizing pulse generator(15), and this synchronizing pulse is delayed by the delay circuit for whole synchronizing, thereby resetting the counter(4) by the delayed synchronizing pulse.

As the above-mentioned, since the f·$\theta$ correcting lenses are not used, the optical system is simple in construction, and is easy in coupling and controlling of the light path. Also the cost of its production can be reduced as well as can be constructed at low cost.

It is further understood by those skilled in the art that the foregoing description is that of one preferred embodiment of the present invention and that various changes and modifications may be made in the invention without departing from the spirit and scope thereof.

What is claimed is:

1. An electrical f·$\theta$ correction system in a laser system having a rotating polygon mirror for deflecting a laser beam, collimator lens for deflecting the laser beam into parallel light rays, a photosensitive drum, a photo diode for detecting the beam reflected by a reflecting mirror after scanning completion of one line, an amplifier for amplifying said detected beam, a horizontal synchronizing pulse generator for receiving output from said amplifier to generate a synchronizing pulse, and a delay circuit for producing a delayed pulse for whole synchronizing to thereby reset a counter, characterized in that said f·$\theta$ correction system comprises:

drive signal detecting means for detecting a predetermined signal caused by rotation of a chopper grooved at intervals corresponding to a uniform speed correction and disposed on the driving shaft of said rotating polygon mirror, driving pulse generating means for generating a pulse signals on the basis of output from said signal detecting means, counting means for counting the pulse signals produced by said driving pulse generating means, clock generating means for driving 3-state buffers at periods corresponding to the scanning angle of the beam according to sequential select signals output from said counting means, a buffer circuit storing picture information, a latch circuit for enabling sequentially said picture information stored in said buffer circuit on the basis of said sequential select signals from said clock generating means, driver means for controlling the laser beam on the basis of output from said latch circuit, and an actuator for generating the laser beam modulated by an output signal from said laser beam driver.

2. An electrical f·$\theta$ correction system according to claim 1, wherein, in said driving pulse generating means, the chopper grooved at intervals corresponding to the uniform speed correction is attached to the shaft of the motor driving said rotating polygon mirror thereby to generate the driving pulse.

3. An electrical f·θ correction system of claim 2, wherein said counting means is reset by the delayed pulse from the delay circuit.

4. The electrical f·θ correction system of claim 1, wherein said driving pulse generating means generates said pulse signals at periods corresponding to angles of deflection of the laser beam imparted by the polygon mirror.

5. The electrical f·θ correction system of claim 1, wherein said pulse signals generated by said driving pulse generating means are separated by intervals corresponding to a uniform speed correction established on the basis of successive scanning angles as the beam is deflected over the width of each said line.

6. The electrical f·θ correction system of claim 5, wherein said driver means controls power of the beam in accordance with the scanning angles of the beam.

7. The electrical f·θ correction system of claim 5, wherein said driving means controls power of the beam in accordance with said graduated intervals.

8. The electrical f·θ correction system of claim 5, wherein said clock signal generating means provides clock signals endowed with different electrical characteristics on the basis of the duration of said intervals as represented by said sequential select signals.

9. The electrical f·θ correction system of claim 1, wherein said actuator controls displacement of the laser beam by controlling a current on the basis of said output signal to displace a source providing the beam along a longitudinal axis of the beam.

10. The electrical f·θ correction system of claim 5, wherein said actuator controls displacement of the laser beam by controlling a current on the basis of said output signal to displace a source providing the beam along a longitudinal axis of the beam.

11. An electrical f·θ correction system, comprising:
means disposed to detect completion of each scan of each line by a beam being scanned through a range of scanning angles over successive lines onto a photosensitive surface, for generating synchronization signals in response to detection of said completion;
pulse signal generating means operating independently of said synchronization signals generating means and in synchronism with scanning of said beam through said range of scanning angles, for generating a series of pulse signals at graduated intervals while the beam scans across each of said lines with each of said pulse signals being generated in synchronism with the scanning of the beam through said range of scanning angles and corresponding to different orientations of the beam relative to each line of scanning;
means for performing counting sequences of said pulse signals, for generating sequential selection signals on the basis of pulse signals counted in each of said series of pulse signals and for resetting said counting sequence in in response to reception of each of said synchronization signals;
means for selectively generating clock singals exhibiting different electrical characteristics corresponding to said scanning angles in response to reception of said selection signals;
means for storing picture information and for being sequentially enabled by said clock signals to generate driving signals on the basis of said picture information; and
driving means for modulating said beam on the basis of said driving signals.

12. The electrical f·θ correction system of claim 11, wherein said pulse signal generating means generates said pulse signals at periods corresponding to said scanning angles.

13. The electrical f·θ correction system of claim 11, wherein said pulse signal generating means generates each of said pulse signals in correspondence to different successive scanning angles.

14. The electrical f·θ correction system of claim 11, wherein said graduated intervals between pulse signals in said series generated by said pulse generating means corresponds to a uniform speed correction established on the basis of successive said scanning angles of the beam over the width of each line.

15. The electrical f·θ correction system of claim 11, wherein said driving means controls power of the beam in accordance with the scanning angle of the beam.

16. The electrical f·θ correction system of claim 11, wherein said driving means controls power of the beam in accordance with graduated intervals.

17. The electrical f·θ correction system of claim 11, wherein said driving means controls power of the beam in accordance with the scanning angle of the beam as represented by said electrical characteristics.

18. The electrical f·θ correction system of claim 11, wherein said driving means controls power of the beam in accordance with the scanning angle of the beam as represented by said electrical periods.

19. The electrical f·θ correction system of claim 11, wherein said clock signal generating means endows said clock signals with said different electrical characteristics on the basis of the duration of said intervals as represented by said sequential selection signals.

20. The electrical f·θ correction system of claim 11, wherein said driving means comprises:
driver means for applying said driving signals to influence generation of the beam; and
actuator means for controlling displacement of the beam according to the scanning angle of the beam.

21. The electrical f·θ correction system of claim 11, wherein said driving means comprises:
driver means for applying said driving signals to influence generation of the beam; and
actuator means for controlling displacement of the beam by controlling a current on the basis of said driving signal to displace a source providing the beam along a longitudinal axis of the beam.

22. An electrical f·θ correction system, comprising:
means disposed to detect completion of each scan of each line by a beam being scanned through a range of scanning angles over successive lines onto a surface, for generating synchronization signals in response to detection of said completion of each scan;
drive signal detecting means for detecting a predetermined signal caused by rotation of a stroboscope slit at intervals corresponding to a uniform speed correction and disposed on a driving shaft of a rotating polygonal mirror scanning said beam over successive lines, said uniform speed correction corresponding to scanning angles of the beam;
driving pulse generating means for generating pulse signals on the basis of said predetermined signal from said signal detecting means;
counting means for responding to said synchronization signals, for making a count of the pulse signals produced by said driving pulse generating means, and for providing select signals on the basis of the count;

clock generating means for generating output pulses exhibiting different periods corresponding to successive scanning angles of the beam in response to sequential said select signals output from said counting means;

means for storing picture information;

latch means for providing output signals for sequentially enabling said picture information, on the basis of said output pulses from said clock generating means;

driver means for controlling projection of the beam on the basis of said output signals from said latch means; and actuator means for generating the beam modulated by an output signal from said driver means.

23. An electrical f·$\theta$ correction system, comprising:

means disposed to detect completion of each scan of each line by a beam being scanned through a range of scanning angles over successive lines onto a photosensitive surface, for generating synchronization signals in response to detecting of said completion;

pulse signal generating means operating in synchronism with scanning of said beam through said range of scanning angles, for generating a series of pulse signals at intervals graduated according to a uniform speed correction while the beam scans across each of said lines, with each of said pulse signals being generated in synchronism with the scanning of the beam through said range of scanning angles and corresponding to different orientations of the beam relative to a line of scanning;

means for performing counting sequences of said pulse signals, for generating sequential selection signals on the basis of pulse signals counted in each of said series of pulse signals and for resetting said counting sequence in response to reception of each of said synchronization signals;

means for selectively generating clock signals exhibiting different periods corresponding to successive said scanning angles in response to sequential reception of said selection signals;

means for storing picture information and for being sequentially enabled by said clock signals to generate driving signals on the basis of said picture information; and driving means for modulating said beam on the basis of said driving signals.

24. The electrical f·$\theta$ correction system of claim 11, further comprised of said pulse signal generating means including a stroboscope containing a plurality of sectors each bearing a plurality of slits with successive ones of said slits in each sector being unequally spaced apart according to a uniform speed correction corresponding to said graduated intervals.

25. The electrical f·$\theta$ correction system of claim 23, further comprised of said pulse signal generating means including a stroboscope containing a plurality of sectors each bearing a plurality of slits with successive ones of said slits in each sector being unequally spaced apart according to a uniform speed correction corresponding to said graduated intervals.

* * * * *

UNITED STATES PATENT AND TRADEMARK OFFICE
CERTIFICATE OF CORRECTION

PATENT NO. : 4,833,489

DATED : 23 May 1989

INVENTOR(S) : Chun Byung-Sik

It is certified that error appears in the above-identified patent and that said Letters Patent is hereby corrected as shown below:

Column 6, line 50, after "scanning angle" insert --$\theta$--.

Signed and Sealed this

Seventeenth Day of July, 1990

Attest:

HARRY F. MANBECK, JR.

Attesting Officer

Commissioner of Patents and Trademarks